(12) United States Patent
Beer et al.

(10) Patent No.: US 11,460,557 B2
(45) Date of Patent: Oct. 4, 2022

(54) APPARATUS AND METHOD FOR TDC SHARING IN RUN TIME-BASED DISTANCE MEASUREMENTS

(71) Applicant: Fraunhofer-Gesellschaft zur Foerderung der angewandten Forschung e.V., Munich (DE)

(72) Inventors: Maik Beer, Duisburg (DE); Olaf Schrey, Duisburg (DE); Christian Nitta, Duisburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 647 days.

(21) Appl. No.: 16/540,731

(22) Filed: Aug. 14, 2019

(65) Prior Publication Data
US 2020/0057150 A1 Feb. 20, 2020

(30) Foreign Application Priority Data
Aug. 16, 2018 (DE) .......................... 102018213819.2

(51) Int. Cl.
| | |
|---|---|
| *H04N 5/77* | (2006.01) |
| *G01S 7/4863* | (2020.01) |
| *G01S 17/10* | (2020.01) |

(52) U.S. Cl.
CPC ............ *G01S 7/4863* (2013.01); *G01S 17/10* (2013.01)

(58) Field of Classification Search
None
See application file for complete search history.

(56) References Cited

U.S. PATENT DOCUMENTS

| | | | | |
|---|---|---|---|---|
| 5,978,599 | A  * | 11/1999 | Wakabayashi | ......... G03B 17/00 396/55 |
| 2010/0253792 | A1* | 10/2010 | Kawaguchi | ...... H04N 5/232411 348/208.4 |

(Continued)

FOREIGN PATENT DOCUMENTS

EP 3309847 A1 4/2018

OTHER PUBLICATIONS

Lindner, Scott et al., "Column-Parallel Dynamic TDC Reallocation in SPAD Sensor Module Fabricated in 180nm CMOS for Near Infrared Optical Tomography", Proc. 2017 Int. Image Sens. Workshop, 2017, 2017, 86-89.

(Continued)

*Primary Examiner* — Eileen M Adams
(74) *Attorney, Agent, or Firm* — Perkins Coie LLP; Michael A. Glenn

(57) ABSTRACT

An apparatus for distance measurement, having one or several optical detector modules and a readout module is provided. The optical detector modules each have a plurality of optical detector elements having one or several optical detectors and a counter indicating a count value, the optical detector elements each being in an active state or an inactive state. Each optical detector module has a timer element configured to determine a current time value and configured to continuously update the current time value, and a memory element for storing a plurality of time values stored. The readout module is configured to determine and output, for each detector module of the one or several optical detector modules, at least for each optical detector element of the optical detector elements of this optical detector module, which is in an inactive state, a time value for this optical detector element in dependence on the count value of the (Continued)

counter of this optical detector element and on the plurality of time values stored.

19 Claims, 5 Drawing Sheets

(56) References Cited

U.S. PATENT DOCUMENTS

2012/0033120 A1* 2/2012 Nakamura ........ H01L 27/14623
348/E5.091
2017/0052065 A1 2/2017 Sharma et al.

OTHER PUBLICATIONS

Niclass, C. et al., "A 128×128 Single-Photon Image Sensor With Column-Level 10-Bit Time-to-Digital Converter Array", IEEE J. Solid-State Circuits, vol. 43, No. 12, pp. 2977-2989, Dec. 2008, Dec. 2008, 2977-2989.

Niclass, C et al., "A CMOS 64×48 Single Photon Avalanche Diode Array with Event-Driven Readout,", Proceedings of the 32nd European Solid-State Circuits Conference, 2006, pp. 556-559, 2006, 556-559.

Veerappan, Chockalingam et al., "A 160×128 Single-Photon Image Sensor with On-Pixel 55ps 10b Time-to-Digital Converter", Solid-State Circuits Conference Digest of Technical Papers (ISSCC); IEEE International, 2011, pp. 312-314; ISSCC 2011 / Session 17 / BIOMEDICAL & DISPLAYS / 17.7.

Villa, Federica et al., "CMOS Imager With 1024 SPADs and TDCs for Single-Photon Timing and 3-D Time-of-Fligh", IEEE J. Sel. Top. Quantum Electron., vol. 20, No. 6, pp. 364-373, Nov. 2014.

Vornicu, I. et al., "A CMOS 0.18 βm 64×64 single photon image sensor with in-pixel 11 b time-to-digital converter", Semiconductor Conference (CAS), 2014 International, 2014, pp. 131-134.

Xie, G., et al., "Single-photon avalanche diode array with column-level time-to-digital converter for unmanned vehicle", International Conference on Opto-Electronic Information Processing (JCOIP), 2017, pp. 49-54.

* cited by examiner

APPARATUS AND METHOD FOR TDC SHARING IN RUN TIME-BASED DISTANCE MEASUREMENTS

CROSS-REFERENCE TO RELATED APPLICATION

This application claims priority from German Patent Application No. 102018213819.2, which was filed on Aug. 16, 2018, and is incorporated herein by reference in its entirety.

BACKGROUND OF THE INVENTION

The application relates to an apparatus and a method for distance measurement and, in particular, to an apparatus and a method for TDC sharing in run time-based distance measurements.

CMOS image sensor technology offers effective ways of recording measurement signals in real time at high speed. This is of great advantage when taking three-dimensional (3D) distance images in time-critical systems. Pulse run time methods and continuously modulated light methods serve for contactless depth detection. Here, the run time of the infrared laser light emitted by an active radiation source and reflected by a target object is measured. This is referred to as LIDAR (light detection and ranging). The focus of the method presented here is sharing circuit parts used for run time measurements, which allows an improvement in the filling factor or space and, consequently, manufacturing high-resolution sensors. Apart from many further fields of application, these features are particularly promising for the automotive sector. Possible applications are ADAS (advanced driver assistance systems) systems, automated driving and avionics.

High requirements to reliability are made in security-relevant systems in particular. Thus, in emergency brake systems, distances to objects present in front of a car are to be detected in real time and reliably. High-resolution sensors here allow precisely detecting the environment since objects can be classified better, and the direction of movement and speed thereof can be estimated better. A high filling factor additionally allows detecting weak light signals originating from remote objects of low reflectance. Since, due to the expected statutory pressure in the automobile industry, there is a great demand for such intelligent systems, or is expected, the result is a considerable market potential for this field of application. Existing CMOS distance measuring methods are already able to record distance images at a very high rate (up to several kfps), which only makes possible many applications in the automotive sector.

Direct run time measurements for distance determination are based on measuring the time light or a laser signal takes from being emitted at an active source, being reflected at an object, to being detected at the sensor. Electronical time measuring devices, like TDCs (time-to-digital converters), are used for measuring this time. These time-measuring devices, in the form of integrated circuits, can be integrated directly on the sensor. In the so-called flash approach, the entire target scene, which corresponds to the field of view (FOV) of the sensor, is exposed to light simultaneously. In the scanning approach, in contrast, the individual image points or pixels of the sensor are exposed one after the other individually, in groups, lines or columns. In order to allow the best efficiency possible for the measuring system, when using the flash approach, run time measurements are performed in parallel in all the pixels. As is illustrated in FIG. 2(a) with the example of a column consisting of three pixels, this may, for example, be realized by integrating a TDC in every pixel. Due to the complexity of the TDC, however, this results in a small one-digit range filling factor, examples of this being 1% [1], 3.14% [2] or 3.5% [3]. For improving the filling factor, the TDCs can be placed elsewhere, i.e. outside the light-sensitive sensor region. In order to keep the wiring complexity low in greater arrays, additionally, one TDC may be shared among several pixels. However, this restricts the completely parallel function of the pixels of the sensor. Literature basically discloses one concept for realizing a TDC for several pixels [4], [5], [6], [7].

FIG. 2 shows the block circuit diagram of a column comprising one TDC per pixel (a) and a shared TDC for a column (b).

Additionally, FIG. 2 shows a plurality of QR (quenching and reset) units which each reset the respective SPAD after starting a (strong) current flow responsive to the optical event, by stopping the current flow in the SPAD and, if applicable, recharging the SPAD.

As is shown in FIG. 2(b) in this concept, the pixels are connected to the TDC via a 1-bit signal line and a k-bit address bus. The 1-bit signal line is connected in a wired-OR manner so that, when detecting an event in any of the pixels, this will pull the signal line to a defined signal level. This change in level is recognized by the TDC which then stores the current time in a memory element. In order to identify which of the pixels has detected the result, the corresponding pixel will apply, in addition to the change in level on the signal line, an individual address on the address bus, which is stored in the memory in combination with the time stamp. Consequently, the address bus width k is dependent on the number of pixels connected. In the case of 16 pixels, for example, a 4-bit address bus is used. The run time measured can be determined for each pixel by associating the time stamp to the address of the pixel.

FIG. 3 shows the signal wave form diagram for sharing a TDC. In particular, FIG. 3 shows an exemplary signal wave form for the signal line and a two-bit address bus for three pixels. After registering a photon in pixel 1, same will pull the signal line to high and at the same time apply its address 00 on the address bus. In the TDC, the current time value 001 is stored in a memory together with the address 00. The same applies to further photons in pixels 2 and 3. This means that, when evaluating, from the memory value 11001, the measuring value 110 can be associated to the pixel having the address 01, which in this case corresponds to pixel 2.

By using a shared TDC pursuant to the concept in [4], [5], [6], [7], the TDC can be placed outside the relevant region, thereby improving the filling factor of the sensor to 28% [4], 6% [5] or 10.47% [7]. Furthermore, the number of vertical signal lines now is 1+k instead of n, n equaling the width of the time stamp of the TDC and k representing the width of the data bus. Depending on the number of pixels sharing a TDC, and on the width of the time stamp, this may be considered to be both an advantage and a disadvantage. In the examples in literature, the width of the address bus is smaller than that of the TDC, meaning that a shared TDC will result in a smaller wiring complexity. Additionally, it is no longer required to guide the signals to the TDC (like clock signals, regulating voltage) via the pixels. Depending on the setup of the TDC, the number of time marks detected may be smaller than the number of pixels, which, however, will result in a loss in information. In accordance with [4], this can be solved by using several TDCs for a group of pixels, wherein, for loss-less measurements, the number of TDCs equals the number of pixels connected. Depending on the architecture of the TDC, it may also be sufficient to implement additional memory for storing the time marks.

A further problem of the concept is the simultaneous photon detection in several pixels of one column. Since the vertical lines are connected in a wired-OR manner, the time measurement will be triggered correctly, however, the address bus will contain an invalid value, meaning that there will be an erroneous allocation of the time value measured, or the setup or hold times of the latches responsible for storing will be violated, which in turn will result in one of the two problems mentioned at first.

SUMMARY

An embodiment may have an apparatus for distance measurement, having one or several optical detector modules and a readout module, wherein each optical detector module of the one or several optical detector modules has: a plurality of optical detector elements having one or several optical detectors and a counter indicating a count value, each of the optical detector elements being in an active state or in an inactive state, a timer element configured to determine a current time value, the timer element being configured to continuously update the current time value, a memory element for storing a plurality of time values stored, wherein each of the optical detector elements of each optical detector module of the one or several optical detector modules, which is in an active state, is configured to perform a reaction responsive to an optical event having been detected at the one or several optical detectors of this optical detector element, wherein the reaction of the optical detector element has outputting a signal to the timer element of this optical detector module and at least to every other of the optical detector elements of this optical detector module, which is in an active state, wherein the timer element is configured to store, upon receiving the signal from this optical detector element, the current time value in the memory element as a time value of the plurality of time values stored, wherein every other of the optical detector elements, which is in an active state, is configured to increase the count value of its counter upon receiving the signal from this optical detector element, wherein every other of the optical detector elements, which is in the inactive state, is configured not to increase the count value of its counter responsive to the signal from this optical detector element, and wherein the reaction of the optical detector element has setting this optical detector element to the inactive state, and wherein the readout module is configured to determine and output, for each detector module of the one or several optical detector modules, at least for each optical detector element of the optical detector elements of this optical detector module, which is in an inactive state, a time value for this optical detector element in dependence on the count value of the counter of this optical detector element and in dependence on the plurality of the time values stored in the memory element.

Another embodiment may have a method for distance measurement by means of an apparatus, the apparatus having one or several optical detector modules and a readout module, each optical detector module of the one or several optical detector modules having a plurality of optical detector elements, a timer element and a memory element, the plurality of optical detector elements having one or several optical detectors and a counter indicating a count value, each of the optical detector elements being in an active state or in an inactive state, the timer element being configured to determine a current time value, the timer element continuously updating the current time value, and the memory element being configured for storing a plurality of time values stored, the method having the steps of: in each optical detector element of the optical detector elements of each optical detector module of the one or several optical detector modules, which is in an active state, responsive to an optical event having been detected at the one or several optical detectors of this optical detector element, performing a reaction by this optical detector element, wherein performing the reaction by this optical detector element has transmitting and outputting a signal to the timer element of this optical detector module and at least to every other of the optical detector elements of this optical detector module, which is in an active state, wherein the timer element is configured to store, responsive to the signal from this optical detector element, the current time value in the memory element as a time value of the plurality of time values stored, wherein, upon receiving the signal from this optical detector element by every other of the optical detector elements, which is in an active state, each of these other optical detector elements increases the count value of its counter, wherein, upon receiving the signal from this optical detector element by every other of the optical detector elements, which is in an inactive state, each of these other optical detector elements does not increase the count value of its counter, wherein performing the reaction by the optical detector element having detected the optical event has setting this optical detector element to the inactive state, and wherein the method has, for each detector module of the one or several optical detector modules, determining and outputting a time value, at least for each optical detector element of the optical detector elements of this optical detector module, which is in an inactive state, in dependence on the count value of the counter of this optical detector element and in dependence on the plurality of the time values stored in the memory element.

Still another embodiment may have a non-transitory digital storage medium having stored thereon a computer program for performing a method for distance measurement by means of an apparatus, the apparatus having one or several optical detector modules and a readout module, each optical detector module of the one or several optical detector modules having a plurality of optical detector elements, a timer element and a memory element, the plurality of optical detector elements having one or several optical detectors and a counter indicating a count value, each of the optical detector elements being in an active state or in an inactive state, the timer element being configured to determine a current time value, the timer element continuously updating the current time value, and the memory element being configured for storing a plurality of time values stored, the method having the steps of: in each optical detector element of the optical detector elements of each optical detector module of the one or several optical detector modules, which is in an active state, responsive to an optical event having been detected at the one or several optical detectors of this optical detector element, performing a reaction by this optical detector element, wherein performing the reaction by this optical detector element has transmitting and outputting a signal to the timer element of this optical detector module and at least to every other of the optical detector elements of this optical detector module, which is in an active state, wherein the timer element is configured to store, responsive to the signal from this optical detector element, the current time value in the memory element as a time value of the plurality of time values stored, wherein, upon receiving the signal from this optical detector element by every other of the optical detector elements, which is in an active state, each of these other optical detector elements increases the count value of its counter, wherein, upon receiving the signal from this optical detector element by every other of the optical detector elements, which is in an inactive state, each of these other optical detector elements does not increase the count value of its counter, wherein performing the reaction by the optical detector element having detected the optical event has setting this optical detector element to the inactive state, and wherein the method has, for each detector module of the one or several optical detector modules, determining and outputting a time value, at least for each optical detector element of the optical detector elements of this optical detector module, which is in an inactive state, in dependence on the count value of the counter of this optical detector element and in dependence on the plurality of the time values stored in the memory element, when said computer program is run by a computer.

An apparatus for distance measurement is provided, comprising one or several optical detector modules and one read-out module. Each of the one or several optical detector modules comprises a plurality of optical detector elements comprising one or several optical detectors and a counter indicating a count value, wherein each of the optical detector elements is in an active state or an inactive state. Furthermore, each optical detector module comprises a timer element configured to determine a current time value, the timer element being configured to continuously update the current time value, and a memory element for storing a plurality of time values stored. The readout module of the apparatus is configured to determine and output, for each detector module of the one or several optical detector modules, at least for each optical detector element of the optical detector elements of this optical detector element, which is in an inactive state, a time value for this optical detector element in dependence on the count value of the counter of this optical detector element and in dependence on the plurality of time values stored in the memory element.

Additionally, an apparatus for distance measurement is provided, comprising one or several optical detector modules and one read-out module.

Each optical detector module of the one or several optical detector modules comprises a plurality of optical detector elements comprising one or several optical detectors and a counter indicating a count value, each of the optical detector elements being in an active state or in an inactive state.

Additionally, each optical detector module comprises a timer element configured to determine a current time value, the timer element being configured to continuously update the current time value, and a memory element for storing a plurality of time values stored.

Each of the optical detector elements of each optical detector module of the one or several optical detector modules, which is in an active state is configured to perform a reaction responsive to an optical event having been detected at the one or several optical detectors of this optical detector element.

The reaction of the optical detector element comprises outputting a signal to the timer element of this optical detector module and at least to every other of the optical detector elements of this optical detector module, which is in an active state.

The timer element is configured to store, responsive to receiving the signal from this optical detector element, the current time value in the memory element as a time value of the plurality of time values stored.

Every other of the optical detector elements, which is in an active state, is configured to increase the count value of its counter upon receiving the signal from this optical detector element.

In addition, every other of the optical detector elements, which is in the inactive state, is configured not to increase the count value of its counter responsive to the signal from this optical detector element.

The reaction of the optical detector element comprises setting this optical detector element to the inactive state.

The readout module of the apparatus is configured to determine and output, for each detector module of the one or several optical detector modules, at least for each optical detector element of the optical detector elements of this optical detector module, which is in an inactive state, a time value for this optical detector element in dependence on the count value of the counter of this optical detector element and in dependence on the plurality of time values stored in the memory element.

Furthermore, a method for distance measuring by means of an apparatus is provided, the apparatus comprising one or several optical detector modules and a readout module. Each optical detector element of the one or several optical detector modules comprises a plurality of optical detector elements, a timer element and a memory element. The plurality of optical detector elements comprises one or several optical detectors and a counter which indicates a count value. Thus, each of the optical detector elements is in an active state or in an inactive state. The timer element is configured to determine a current time value, the timer element continuously updating the current time value. The memory element is configured for storing a plurality of time values stored. The method comprises:

In each optical detector element of the optical detector elements of each optical detector modules of the one or several optical detector modules, which is in an active state, responsive to an optical event having been detected at the one or several optical detectors of this optical detector element, performing a reaction by this optical detector element.

Performing the reaction by this optical detector element comprises transmitting and outputting a signal to the timer element of this optical detector module and at least to every other of the optical detector elements of this optical detector module, which is in an active state.

The timer element is configured to store, responsive to the signal from this optical detector element, the current time value in the memory element as a time value of the plurality of time values stored.

Upon receiving the signal from this optical detector element by every other of the optical detector elements, which is in an active state, each of these other optical detector elements will increase the count value of its counter.

Upon receiving the signal from this optical detector element by every other of the optical detector elements, which is in an inactive state, each of these other optical detector elements will increase the count value of its counter.

Performing the reaction by the optical detector element having detected the optical event comprises setting this optical detector element to the inactive state.

In addition, the method comprises, for each detector module of the one or several optical detector modules, determining and outputting a time value, at least for each optical detector element of the optical detector elements of this optical detector module, which is in an inactive state, in dependence on the count value of the counter of this optical detector element and in dependence on the plurality of the time values stored in the memory element.

BRIEF DESCRIPTION OF THE DRAWINGS

Embodiments of the invention will be described below referring to the appended drawings, in which.

DETAILED DESCRIPTION OF THE INVENTION

At first, concepts of the invention will be discussed, taking a special example of FIG. 4, only exemplarily so as to improve understanding of a specific example.

The invention relates to a concept of sharing the TDC among several pixels of a two-dimensional array, like of a column, wherein the number of connective lines is not scaled with the number of pixels. In analogy to the concept mentioned in the literature, all the pixels are connected to the TDC via a shared 1-bit signal line, which is connected in a wired-OR manner. When detecting an event in one of the pixels, it puts the signal line to a defined potential, whereupon the TDC stores the current time value. As is illustrated in FIG. 4, each pixel contains, in addition to the basic circuit for event detection, a counter fed by the signal line.

Correspondingly, the counter continues counting with each event detection of a pixel involved. Since the counter will only continue counting until the pixel where the counter is located detects an event itself, the count at the end of a measuring cycle corresponds to the number of time stamps stored by the TDC in chronological order. This means that it is possible to associate the time stamps to the pixels by reading out the counts.

Figure 4:
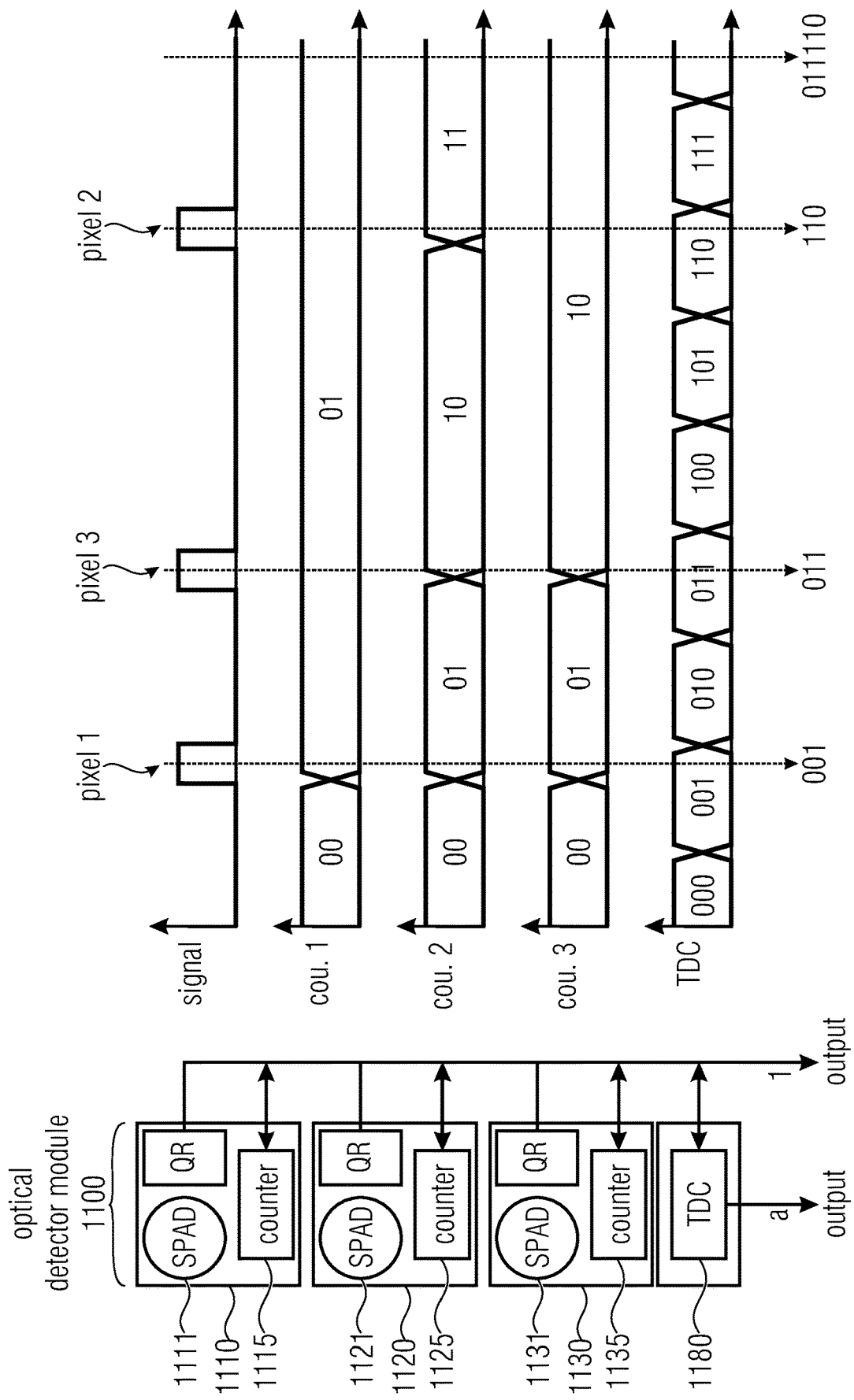
FIG. 4 shows a block circuit diagram and a signal waveform diagram in accordance with an embodiment.

FIG. 4 shows a block circuit diagram and a signal waveform diagram in accordance with an embodiment.

Thus, the signal waveform diagram in FIG. 4 exemplarily shows the signal waveforms on the signal line and the counts of the pixels and the TDC. When detecting an event in pixel 1, the signal line is pulled to high for a short time, this change in signal is recognized by the TDC, whereupon the same stores the current time value 001. The pulse on the signal line is applied to the counters of all the pixels, which is why they increment their count values. When detecting the event in pixel 1, the respective counter is disabled. In the example shown, the counter still counts the event of its own pixel, before being disabled. Other variations are also conceivable. When detecting an event in pixel 3, the current time value 011 is stored again and the counters of all the pixels which, up to this time, have not detected an event are incremented. The counter of pixel 1 will consequently keep its value. In analogy, when detecting an event in pixel 2, the time value is written down and only the remaining counter in pixel 2 is incremented. At the end of the cycle, the counters 1, 2 and 3 contain the values 01, 11 and 10, respectively. The time marks of the TDC in chronological order are 001, 011 and 110. From this information, the time marks can then be associated to the pixels, meaning that the first time mark belongs to pixel 1, the third time mark belongs to pixel 2 and the second time mark belongs to pixel 3.

In order to avoid additional signal lines, the counters of the pixels are readout via the line which also serves for triggering the TDC. Since the data here can only be readout serially, the individual groups—in this example, the column—are readout in parallel. One example: an array of 256×256 pixels is considered, wherein the 256 pixels of one column share a TDC. Counters having a width of 8 bits are used for 256 pixels. In addition, each TDC is able to store up to 256 time marks. When reading out a time mark with each clock, 65536 clock periods are used for reading out. In order to not increase the number of clock cycles used for reading out all the data, the counts of the pixels in 8 columns have to be readout in parallel. In the present example, reading out with a clock of 50 MHz would have a duration of 1.31 ms. However, at most, all the 256 columns can be readout in parallel, using 2048 clock cycles for reading out the counts, which, with the 50 MHz mentioned, would correspond to 40.96 µs. However, in this case, 32 time marks have to be readout in parallel, thereby rendering the number of pads used 256+32n, n indicating the width of the time mark. This means that 640 pads would be used for a width of 12 bits. A further acceleration could be achieved by simultaneously reading out at the top end of the columns, in which case the number of vertical signal lines—in the case of a column—would not increase, but the number of pads used would double. The problem of simultaneous events in several pixels is also alleviated by this concept. If, while the signal line is high, there is an event in another pixel, the level on the signal line will not be changed again. Correspondingly, no new time mark will be generated in the TDC. In addition, after the end of the measuring cycle, both pixels have the same count value, meaning that an identical time stamp is associated to both of them. This behavior will apply whenever the distance between the two events is shorter than the pulse width on the signal line. In case the resolution of the TDC is smaller than the pulse width, this will result in a reduction in resolution, since the same count value is associated to the second event as is to the first one, although the same may have taken place at a later time only. The temporal minimum distance between two events is, apart from the pulse width, also limited by the duration of conversion of the TDC. In order to prevent the high phase of the signal line from being prolonged again by temporally offset events, it can be achieved by means of circuit technology that, when the line in the case of an event is high already, no output pulse, which would prolong the high phase will be generated at the pixel. In order to reduce the blocking duration, instead of a pulse having a rising and a falling edge, only the line may be inverted. This would approximately halve the blocking duration and at the same time reduces power consumption since the line only has to be re-charged once.

As has been explained, the pixel TDC may be outsourced, i.e. placed outside the light-sensitive sensor region, in order to improve the filling factor of SPAD (single-photon avalanche diode) matrices. The resulting shared usage of a TDC outside the relevant pixel area improves the filling factor of a SPAD sensor, depending on the application, from 3% to more than 50%. In addition, by reducing the number of vertical signal lines, the integration of considerably larger SPAD matrices is possible also in a standard CMOS, since using 3D hybrid integration, for example, is no longer absolutely necessary. Depending on the number of pixels sharing a TDC, and on the width of the time stamp, advantageous compromises between line number and minimum depth resolution for the respective application can be achieved. By reducing the address bus width compared to the bus width of the TDC, using a shared TDC results in lower a wiring complexity. In addition, it is no longer required to guide the signals to the TDC (like clock signals, regulating voltage) via the pixels. In case the time resolution of the TDC is smaller than the pulse width, the former will decrease, however, this is not of relevance for medium and high ranges, since a depth chart coarsely quantized with 10 to 20 cm is absolutely sufficient for, for example, triggering a collision alarm in an automobile with an object distance of 20 m, for example. In the near range, the depth resolution can be increased by simple electronical measures, for example by not using all the lines for generating an event. In addition, in order to reduce the blocking duration, a line can be easily inverted instead of a pulse having rising and falling edges. This would approximately halve the blocking duration and at the same time reduces power consumption since the line only has to be recharged once. Due to the flexible ways of operating the underlying CMOS combining technology, in this way most different scenarios may be responded to in a suitable manner.

Figure 1:
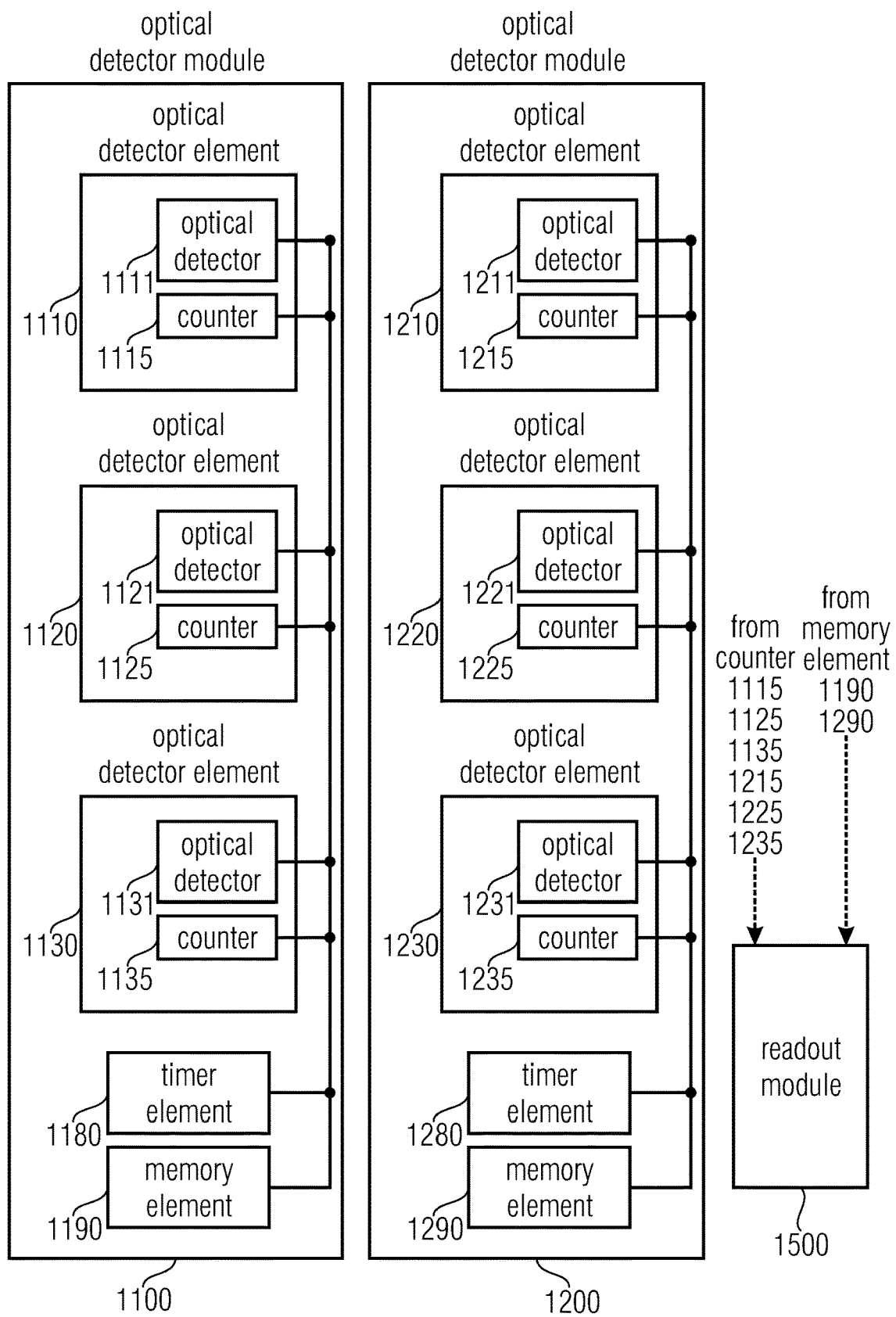
FIG. 1 shows an apparatus for distance measurement in accordance with an embodiment.
Figure 2A:
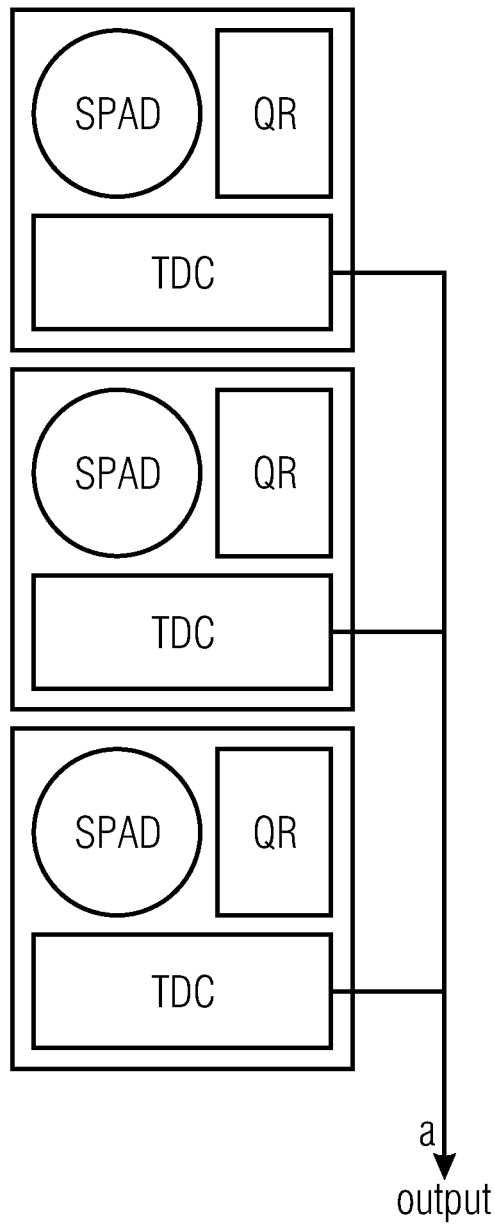
FIG. 2(a)-2(b) shows the block circuit diagram of a column with a TDC per pixel (a) and a shared TDC for a column (b)
Figure 2B:
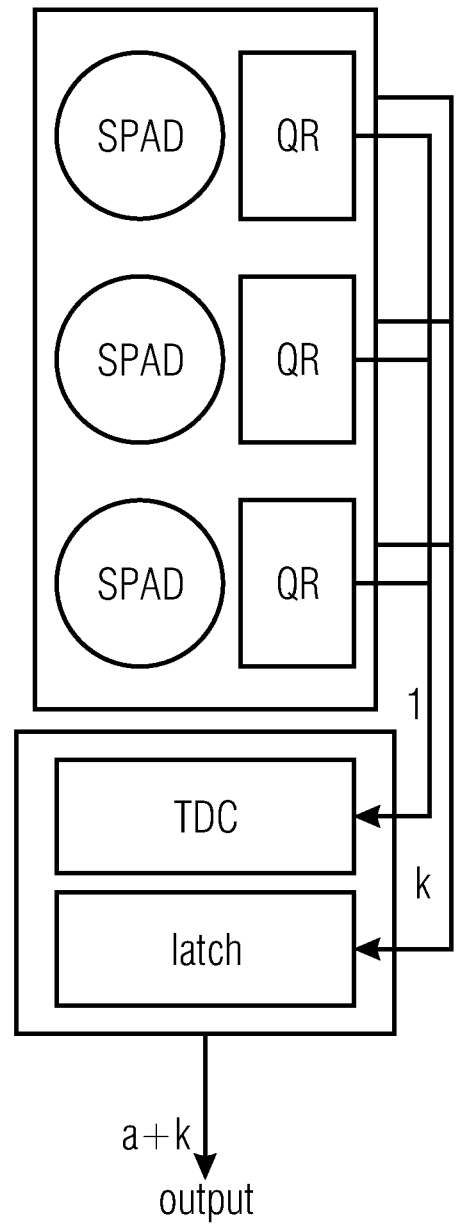
Figure 3:
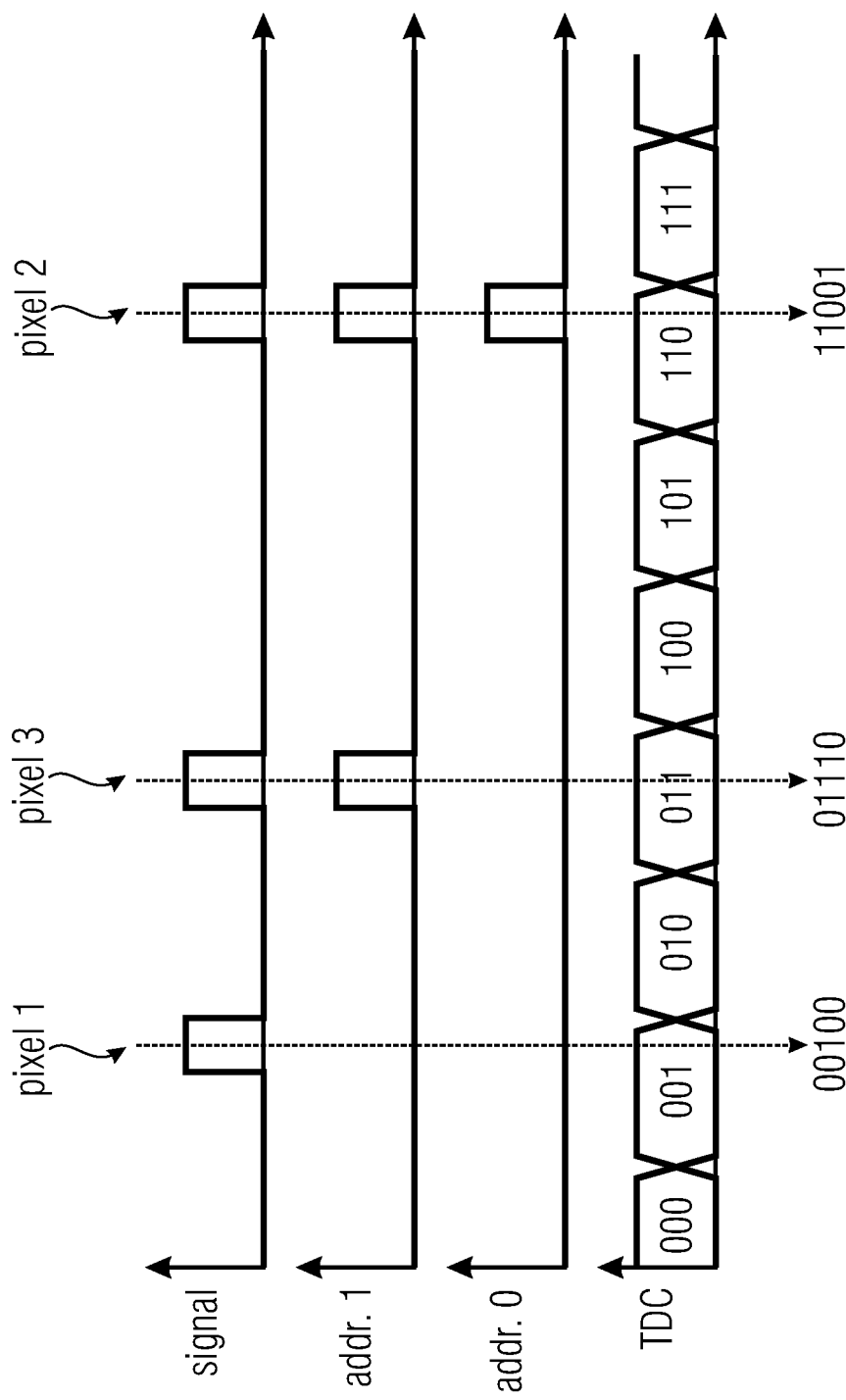
FIG. 3 shows a signal waveform diagram for sharing a TDC.

A general embodiment of the invention will be described below:

FIG. 1 shows an apparatus for distance measurement in accordance with an embodiment, comprising one or several optical detector modules 1100, 1200 and a readout module 1500.

Each optical detector module of the one or several optical detector modules 1100, 1200 comprises a plurality of optical detector elements 1110, 1120, 1130, 1210, 1220, 1230 comprising one or several optical detectors 1111, 1121, 1131, 1211, 1221, 1231 (like an SPAD each) and a counter 1115, 1125, 1135, 1215, 1225, 1235 indicating a count value, each of the optical detector elements 1110, 1120, 1130, 1210, 1220, 1230 being either in an active state or in an inactive state.

Additionally, each of the optical detector modules 1100, 1200 comprises a timer element 1180, 1280 configured to determine a current time value, the timer element 1180, 1280 being configured to continuously update the current time value, and a memory element 1190, 1290 for storing a plurality of time values stored.

Each of the optical detector elements 1110, 1120, 1130, 1210, 1220, 1230 of each optical detector module of the one or several optical detector modules 1100, 1200, which is in an active state, is configured to perform a reaction responsive to an optical event having been detected at the one or several optical detectors 1111 of this optical detector element 1110.

The reaction of the optical detector element 1110 comprises outputting a signal to the timer element 1180 of this optical detector module 1100 and at least to every other of the optical detector elements 1120, 1130 of this optical detector module, which is in an active state.

The timer element 1180 is configured to store, upon receiving the signal from this optical detector element, the current time value in the memory element 1190 as a time value of the plurality of time values stored.

Every other of the optical detector elements 1120, which is in an active state, is configured to increase the count value of its counter upon receiving the signal from this optical detector element.

Additionally, every other of the optical detector elements 1130, which is in the inactive state, is configured not to increase the count value of its counter responsive to the signal from this optical detector element.

The reaction of the optical detector element 1110 comprises setting this optical detector element 1110 to the inactive state.

The readout module 1500 of the apparatus is configured to determine and output, for each detector module of the one or several optical detector modules 1100, 1200, at least for each optical detector element of the optical detector elements of this optical detector module, which is in an inactive state, a time value for this optical detector element in dependence on the count value of the counter of this optical detector element and in dependence on the plurality of time values stored in the memory element.

What follows is a discussion of preferred embodiments of the invention:

In accordance with an embodiment, the readout module 1500 may, for example, be configured to determine, for each optical detector module of the one or several optical detector modules 1100, 1200, at least for each optical detector element, which is in an inactive state, the time value for this optical detector element such that the readout module 1500 determines, based on the count value of the counter 1115, 1125, 1135, 1215, 1225, 1235 of this optical detector element, which of the time values stored in the memory element 1190, 1290 is the time value of this optical detector element.

In one embodiment, the timer element 1180, 1280 of each of the optical detector module 1100, 1200 may, for example, be configured to store, responsive to the signal from any of the optical detector elements 1110, 1120, 1130, 1210, 1220, 1230 of this optical detector module, the current time value in the memory element 1190, 1290 as a time value of the plurality of time values stored such that the time values stored in the memory element 1190, 1290 are stored in a temporally ordered manner in a temporal order such that each of the time values stored in the memory element 1190, 1290 comprises a temporal position in the temporal order. Thus, the readout module 1500 may, for example, be configured to determine, for each optical detector module of the one or several optical detector modules 1100, 1200, at least for each optical detector element, which is in an inactive state, the time value for this optical detector element such that the readout module 1500 will determine, using the count value of the counter 1115, 1125, 1135, 1215, 1225, 1235 of this optical detector element, which temporal position that time value of the time values stored in the temporal order comprises, which is the time value of this optical detector element.

In accordance with an embodiment, the timer element 1180, 1280 of each of the optical detector modules 1100, 1200 may, for example, be configured to store, responsive to the signal from any of the optical detector elements 1110, 1120, 1130, 1210, 1220, 1230 of this optical detector module, the current time value in the memory element 1190, 1290 as a time value of the plurality of time values stored such that the plurality of time values stored in the memory element 1190, 1290 are stored in a temporally ordered manner on a memory stack, or are stored in a temporally ordered manner as a chain-linked list, or are stored in a temporally ordered manner so that, for each time value of the temporally ordered time values stored, an additional number indicates at which position this time value of the temporally ordered time values stored is located.

In one embodiment, the readout module 1500 may, for example, be configured to establish a temporal order of the time values stored in the memory element 1190, 1290 using the time values of the plurality of time values stored in the memory element 1190, 1290 such that each of the time values stored in the memory element 1190, 1290 comprises a temporal position in the temporal order. Thus, the readout module 1500 may, for example, be configured to determine, for each optical detector module of the one or several optical detector modules 1100, 1200, at least for each optical detector element, which is in an inactive state, the time value for this optical detector element such that the readout module 1500 determines, using the count value of the counter 1115, 1125, 1135, 1215, 1225, 1235 of this optical detector element, at which position in the memory element 1190, 1290 that time value of the temporally ordered time values stored is located, which is the time value of this optical detector element.

In accordance with an embodiment, the reaction of the optical detector element may, for example, comprise increasing the count value of the counter 1115, 1125, 1135, 1215, 1225, 1235 of this optical detector element before setting this optical detector element to the inactive state.

In one embodiment, the reaction of the optical detector element may, for example, comprise setting this optical detector element to the inactive state, without increasing the counter 1115, 1125, 1135, 1215, 1225, 1235 of this optical detector element.

In accordance with an embodiment, each optical detector of the one or several optical detectors of each optical detector element of each optical detector module of the one several optical detector modules 1100, 1200 may, for example, be a photodiode.

In one embodiment, the photodiode of each optical detector element of each optical detector module of the one or several optical detector modules 1100, 1200 may, for example, be a single-photon avalanche photodiode. Thus, each optical detector element of each optical detector module of the one or several optical detector modules 1100, 1200 may additionally comprise a quench and reset unit configured for resetting the single-photon avalanche photodiode after detecting the optical event at the single-photon avalanche photon diode.

In accordance with an embodiment, each optical detector element of each optical detector module of the one or several optical detector modules 1100, 1200 may, for example, comprise precisely one optical detector.

In one embodiment, each optical detector element of each optical detector module of the one or several optical detector modules 1100, 1200 may, for example, comprise two or more optical detectors.

In accordance with an embodiment, each of the optical detector elements 1110, 1120, 1130, 1210, 1220, 1230 of each of the one or several optical detector modules 1100, 1200, which is in an active state, may be configured to perform the reaction already when having detected the optical event by at least one of the two or several optical detectors of this optical detector element.

In one embodiment, each of the optical detector elements 1110, 1120, 1130, 1210, 1220, 1230 of each of the one or several optical detector modules 1100, 1200, which is in an active state, may, for example, be configured to only perform the reaction when having detected the optical event by at least two of the two or more optical detectors of this optical detector element.

In one embodiment, each of the optical detector elements 1110, 1120, 1130, 1210, 1220, 1230 of each of the one or several optical detector modules 1100, 1200, which is in an active state, may, for example, be configured to only perform the reaction when having detected the optical event by all of the two or more optical detectors of this optical detector element.

In accordance with an embodiment, the optical detector elements 1110, 1120, 1130, 1210, 1220, 1230 of each of the two or more optical detector modules 1100, 1200 may, for example, be arranged in two or more columns such that each column of the two or more columns comprises all the optical detector elements 1110, 1120, 1130, 1210, 1220, 1230 of precisely one optical detector module of the two or more optical detector modules 1100, 1200.

In one embodiment, the apparatus may, for example, be configured to perform a distance measurement such that, at the beginning of the distance measurement, each of the optical detector elements 1110, 1120, 1130, 1210, 1220, 1230 of each of the one or several optical detector modules 1100, 1200 is in the active state. Thus, the apparatus may, for example, be configured to stop the distance measurement by the readout module 1500 determining, for each optical detector module of the one or several optical detector modules 1100, 1200, the time value for each of the optical detector elements 1110, 1120, 1130, 1210, 1220, 1230 of this optical detector module when each of the optical detector elements 1110, 1120, 1130, 1210, 1220, 1230 of each of the one or several optical detector modules 1100, 1200 is in the inactive state.

In accordance with an embodiment, the apparatus may, for example, be configured to perform a distance measurement such that, at the beginning of the distance measurement, each of the optical detector elements 1110, 1120, 1130, 1210, 1220, 1230 of each of the one or several optical detector modules 1100, 1200 is in the active state. Thus, the apparatus may, for example, be configured to stop the distance measurement after a pre-defined time has passed after starting the distance measurement, by the readout module 1500 determining, for each optical detector module of the one or several optical detector modules 1100, 1200, at least for each optical detector element, which is in an inactive state, the time value for this optical detector element.

In one embodiment, the apparatus may, for example, be configured to perform a distance measurement such that, at the beginning of the distance measurement, each of the optical detector elements 1110, 1120, 1130, 1210, 1220, 1230 of each of the one or several optical detector modules 1100, 1200 is in the active state. Thus, the apparatus may, for example, be configured to stop the distance measurement after a predetermined time has passed after detecting an optical event at the one or several optical detectors of one of the optical detector elements 1110, 1120, 1130, 1210, 1220, 1230 of one of the optical detector modules 1100, 1200, by the readout module 1500 determining, for each optical detector module of the one or several optical detector modules 1100, 1200, at least for each optical detector element, which is in an active state, the time value for this optical detector element.

Figure 5:
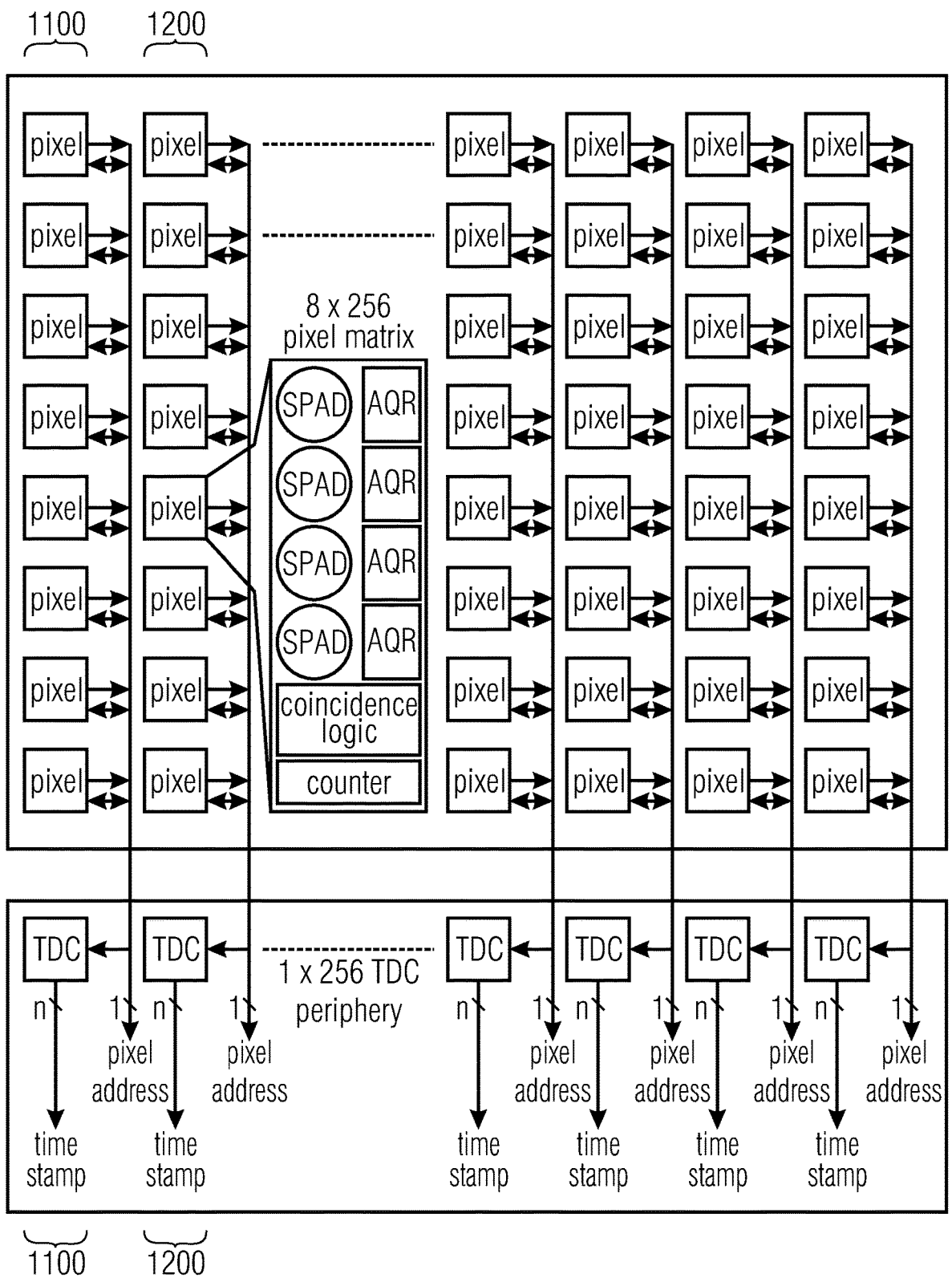
FIG. 5 shows a CMOS line sensor in accordance with an embodiment.

A special embodiment will be described below. FIG. 5 shows a CMOS line sensor having four coincidence sub-SPADs and 8×256 pixels, wherein the CMOS line sensor of the readout concept presented is realized in accordance with an embodiment. Thus, FIG. 5 shows a block circuit diagram of an 8×256 SPAD matrix having an integrated 4-fold coincidence. AQR means active quenching and resetting.

A SPAD matrix sensor having 8 lines and 256 columns was realized. The peculiarity here is that the underlying pixel does not consist of only one SPAD cell, but of 4 individual SPADs which, in combination with coincidence logic, are used for an effective back light suppression. The array realized here made up of 8×256 pixels is set up such that 8 pixels of one column share a TDC. For 8 pixels, counters having a width of 3 bits are used. The TDC is implemented for storing 8 time marks. A time mark is readout with each clock so that 2048 clock periods are used for readout. In order not to increase the number of clock cycles used for reading out the entire data, the counts of the pixels in 3 columns are readout in parallel. In the present realization, with a clock of 25 MHz, reading out will consequently have a duration of 2048 clocks×$\frac{1}{25}$ MHz=81.92 μs. Subsequently, reading out takes place via a digital chip interface. By placing the TDC elsewhere, in this case in the lower matrix periphery, in the realization shown here, a filling factor of approximately 20% can still be achieved with an increased pixel complexity—like in this case the 4-fold coincidence in each pixel. If the TDC was integrated in the pixel, the filling factor would decrease to below 3%. By using micro lenses, the filling factor can be increased to more than 80%, corresponding to highly detailed imaging.

Apart from the embodiment mentioned of an integrated CMOS sensor, the method presented may also be realized in an integrated manner by means of silicon photon multipliers (SiPMs) or avalanche diodes, or in a distributed manner having discrete devices, and as a pure computer program. The concepts provided here may also be utilized in 3D hybrid integration by means of wafer-to-wafer, chip-to-wafer or chip-to-chip bonding including the respective readout combining technology and in different technologies like CMOS or III-V semiconductors in different structural sizes. Apart from the applications mentioned in the automotive sector, the method may also be transferred to further fields of application, like medical technology, analytics or avionics.

Although some aspects have been described in the context of an apparatus, it is clear that these aspects also represent a description of the corresponding method, such that a block or device of an apparatus also corresponds to a respective method step or a feature of a method step. Analogously, aspects described in the context of or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software or at least partly in hardware or at least party in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier. In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier or the digital storage medium or the computer-readable medium is typically tangible and/or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can be performed electronically or optically. The receiver may, for example, be a computer, a mobile device, a memory device or the like.

The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be a universally applicable hardware, such as a computer processor (CPU), or hardware specific for the method, such as ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] C. Veerappan et al., "A 160×128 single-photon image sensor with on-pixel 55 ps 10b time-to-digital converter,"

in Solid-State Circuits Conference Digest of Technical Papers (ISSCC), 2011 IEEE International, 2011, pp. 312-314.
[2] F. Villa et al., "CMOS Imager With 1024 SPADs and TDCs for Single-Photon Timing and 3-D Time-of-Flight," IEEE J. Sel. Top. Quantum Electron., vol. 20, no. 6, pp. 364-373, November 2014.
[3] I. Vornicu, R. Carmona-Galan, and A. Rodriguez-Vazquez, "A CMOS 0.18 μm 64×64 single photon image sensor with in-pixel 11 b time-to-digital converter," in Semiconductor Conference (CAS), 2014 International, 2014, pp. 131-134.
[4] S. Lindner, C. Zhang, 1. M. Antolovic, J. Mata Pavia, M. Wolf, and E. Charbon, "Column-Parallel Dynamic TDC Reallocation in SPAD Sensor Module Fabricated in 180 nm CMOS for Near Infrared Optical Tomography," Proc. 2017 Int. Image Sens. Workshop, 2017.
[5] C. Niclass, C. Favi, T. Kluter, M. Gersbach, and E. Charbon, "A 128×128 Single-Photon Image Sensor With Column-Level 10-Bit Time-to-Digital Converter Array," IEEE J. Solid-State Circuits, vol. 43, no. 12, pp. 2977-2989, December 2008.
[6] C. Niclass, M. Sergio, and E. Charbon, "A CMOS 64×48 Single Photon Avalanche Diode Array with Event-Driven Readout," in 2006 Proceedings of the 32nd European Solid-State Circuits Conference, 2006, pp. 556-559.
[7] G. Xie, Y. Xu, D. Lian, Z. Zhang, and J. Zhang, "Single-photon avalanche diode array with column-level time-to-digital converter for unmanned vehicle," in 2017 IEEE 2nd International Conference on Opto-Electronic Information Processing (JCOIP), 2017, pp. 49-54.

The invention claimed is:
1. An apparatus for distance measurement, comprising one or several optical detector modules and a readout module,
wherein each optical detector module of the one or several optical detector modules comprises:
a plurality of optical detector elements comprising one or several optical detectors and a counter indicating a count value, each of the optical detector elements being in an active state or in an inactive state,
a timer element configured to determine a current time value, the timer element being configured to continuously update the current time value,
a memory element for storing a plurality of time values stored,
wherein each of the optical detector elements of each optical detector module of the one or several optical detector modules, which is in an active state, is configured to perform a reaction responsive to an optical event having been detected at the one or several optical detectors of this optical detector element,
wherein the reaction of the optical detector element comprises outputting a signal to the timer element of this optical detector module and at least to every other of the optical detector elements of this optical detector module, which is in an active state,
wherein the timer element is configured to store, upon receiving the signal from this optical detector element, the current time value in the memory element as a time value of the plurality of time values stored,
wherein every other of the optical detector elements, which is in an active state, is configured to increase the count value of its counter upon receiving the signal from this optical detector element,
wherein every other of the optical detector elements, which is in the inactive state, is configured not to increase the count value of its counter responsive to the signal from this optical detector element, and
wherein the reaction of the optical detector element comprises setting this optical detector element to the inactive state, and
wherein the readout module is configured to determine and output, for each detector module of the one or several optical detector modules, at least for each optical detector element of the optical detector elements of this optical detector module, which is in an inactive state, a time value for this optical detector element in dependence on the count value of the counter of this optical detector element and in dependence on the plurality of the time values stored in the memory element.

2. The apparatus in accordance with claim 1,
wherein the readout module is configured to determine, for each optical detector module of the one or several optical detector modules, at least for each optical detector element of the optical detector elements of this optical detector module, which is in an inactive state, the time value for this optical detector element such that the readout module determines, based on the count value of the counter of this optical detector element, which of the time values stored in the memory element is the time value of this optical detector element.

3. The apparatus in accordance with claim 1,
wherein the timer element of each of the optical detector modules is configured to store, responsive to the signal from one of the optical detector elements of this optical detector module, the current time value in the memory element as a time value of the plurality of time values stored such that the time values stored in the memory element are stored in a temporally ordered manner in a temporal order such that each of the time values stored in the memory element comprises a temporal position in the temporal order, and
wherein the readout module is configured to determine, for each optical detector module of the one or several optical detector modules, at least for each optical detector element of the optical detector elements of this optical detector module, which is in an inactive state, the time value for this optical detector element such that the readout module determines, using the count value of the counter of this optical detector element, which temporal position that time value of the time values stored in the temporal order comprises, which is the time value of this optical detector element.

4. The apparatus in accordance with claim 3,
wherein the timer element of each of the optical detector modules is configured to store, responsive to the signal from any of the optical detector elements of this optical detector module, the current time value in the memory element as a time value of the plurality of time values stored such that the plurality of time values stored in the memory element
are stored in a temporally ordered manner on a memory stack or
are stored in a temporally ordered manner as a chain-linked list or
are stored in a temporally ordered manner such that, for each time value of the temporally ordered time values stored, an additional number indicates at which position this time value of the temporally ordered time values stored is located.

5. The apparatus in accordance with claim 1,
wherein the readout module is configured to establish, using the time values of the plurality of time values stored in the memory element, a temporal order of the time values stored in the memory element so that each of the time values stored in the memory element comprises a temporal position in the temporal order, and
wherein the readout module is configured to determine, for each optical detector module of the one or several optical detector modules, at least for each optical detector element of the optical detector elements of this optical detector module, which is in an inactive state, the time value for this optical detector element such that the readout module determines, using the count value of the counter of this optical detector element, at which position in the memory element that time value of the temporally ordered time values stored is located, which is the time value of this optical detector element.

6. The apparatus in accordance with claim 1,
wherein the reaction of the optical detector element comprises increasing the count value of the counter of this optical detector element before this optical detector element is set to the inactive state.

7. The apparatus in accordance with claim 1,
wherein the reaction of the optical detector element comprises setting this optical detector element to the inactive state, without increasing the counter of this optical detector element.

8. The apparatus in accordance with claim 1,
wherein each optical detector of the one or several optical detectors of each optical detector element of each optical detector module of the one or several optical detector modules is a photodiode.

9. The apparatus in accordance with claim 8,
wherein the photodiode of each optical detector element of each optical detector module of the one or several optical detector modules is a single-photon avalanche photodiode,
wherein each optical detector element of each optical detector module of the one or several optical detector modules additionally comprises a quenching and resetting unit configured for resetting the single-photon avalanche photodiode after detecting the optical event at the single-photon avalanche photodiode.

10. The apparatus in accordance with claim 1,
wherein each optical detector element of each optical detector module of the one or several optical detector modules comprises precisely one optical detector.

11. The apparatus in accordance with claim 1,
wherein each optical detector element of each optical detector module of the one or several optical detector modules comprises two or more optical detectors.

12. The apparatus in accordance with claim 11,
wherein each of the optical detector elements of each of the one or several optical detector modules, which is in an active state, is configured to already perform the reaction when having detected the optical event by at least one of the two or several optical detectors of this optical detector element.

13. The apparatus in accordance with claim 11,
wherein each of the optical detector elements of each of the one or several optical detector modules, which is in an active state, is configured to only perform the reaction when having detected the optical event by at least two of the two or more optical detectors of this optical detector element.

14. The apparatus in accordance with claim 1,
wherein the optical detector elements of each of the two or more optical detector modules are arranged as two or more columns such that each column of the two or more columns comprises all the optical detector elements of precisely one optical detector module of the two or more optical detector modules.

15. The apparatus in accordance with claim 1,
wherein the apparatus is configured to perform a distance measurement such that, at the beginning of the distance measurement, each of the optical detector elements of each of the one or several optical detector modules is in the active state, and
wherein the apparatus is configured to stop the distance measurement by the readout module determining, for each optical detector module of the one or several optical detector modules, the time value for each of the optical detector elements of this optical detector module when each of the optical detector elements of each of the one or several optical detector modules is in the inactive state.

16. The apparatus in accordance with claim 1,
wherein the apparatus is configured to perform a distance measurement such that, at the beginning of the distance measurement, each of the optical detector elements of each of the one or several optical detector modules is in the active state, and
wherein the apparatus is configured to stop the distance measurement after a predefined time has passed after beginning the distance measurement by the readout module determining, for each optical detector module of the one or several optical detector modules, at least for each optical detector element of the optical detector elements of this optical detector module, which is in an inactive state, the time value for this optical detector element.

17. The apparatus in accordance with claim 1,
wherein the apparatus is configured to perform a distance measurement such that, at the beginning of the distance measurement, each of the optical detector elements of each of the one or several optical detector modules is in the active state, and
wherein the apparatus is configured to stop the distance measurement after a predefined time has passed after detecting an optical event at the one or several optical detectors of any of the optical detector elements of any of the optical detector modules by the readout module determining, for each optical detector module of the one or several optical detector modules, at least for each optical detector element of the optical detector elements of this optical detector module, which is in an inactive state, the time value for this optical detector element.

18. A method for distance measurement by means of an apparatus, the apparatus comprising one or several optical detector modules and a readout module, each optical detector module of the one or several optical detector modules comprising a plurality of optical detector elements, a timer element and a memory element, the plurality of optical detector elements comprising one or several optical detectors and a counter indicating a count value, each of the optical detector elements being in an active state or in an inactive state, the timer element being configured to determine a current time value, the timer element continuously updating the current time value, and the memory element being configured for storing a plurality of time values stored, the method comprising:

in each optical detector element of the optical detector elements of each optical detector module of the one or several optical detector modules, which is in an active state, responsive to an optical event having been detected at the one or several optical detectors of this optical detector element, performing a reaction by this optical detector element, wherein performing the reaction by this optical detector element comprises transmitting and outputting a signal to the timer element of this optical detector module and at least to every other of the optical detector elements of this optical detector module, which is in an active state, wherein the timer element is configured to store, responsive to the signal from this optical detector element, the current time value in the memory element as a time value of the plurality of time values stored, wherein, upon receiving the signal from this optical detector element by every other of the optical detector elements, which is in an active state, each of these other optical detector elements increases the count value of its counter, wherein, upon receiving the signal from this optical detector element by every other of the optical detector elements, which is in an inactive state, each of these other optical detector elements does not increase the count value of its counter, wherein performing the reaction by the optical detector element having detected the optical event comprises setting this optical detector element to the inactive state, and wherein the method comprises, for each detector module of the one or several optical detector modules, determining and outputting a time value, at least for each optical detector element of the optical detector elements of this optical detector module, which is in an inactive state, in dependence on the count value of the counter of this optical detector element and in dependence on the plurality of the time values stored in the memory element.

19. A non-transitory digital storage medium having stored thereon a computer program for performing a method for distance measurement by means of an apparatus, the apparatus comprising one or several optical detector modules and a readout module, each optical detector module of the one or several optical detector modules comprising a plurality of optical detector elements, a timer element and a memory element, the plurality of optical detector elements comprising one or several optical detectors and a counter indicating a count value, each of the optical detector elements being in an active state or in an inactive state, the timer element being configured to determine a current time value, the timer element continuously updating the current time value, and the memory element being configured for storing a plurality of time values stored, the method comprising:

in each optical detector element of the optical detector elements of each optical detector module of the one or several optical detector modules, which is in an active state, responsive to an optical event having been detected at the one or several optical detectors of this optical detector element, performing a reaction by this optical detector element, wherein performing the reaction by this optical detector element comprises transmitting and outputting a signal to the timer element of this optical detector module and at least to every other of the optical detector elements of this optical detector module, which is in an active state, wherein the timer element is configured to store, responsive to the signal from this optical detector element, the current time value in the memory element as a time value of the plurality of time values stored, wherein, upon receiving the signal from this optical detector element by every other of the optical detector elements, which is in an active state, each of these other optical detector elements increases the count value of its counter, wherein, upon receiving the signal from this optical detector element by every other of the optical detector elements, which is in an inactive state, each of these other optical detector elements does not increase the count value of its counter, wherein performing the reaction by the optical detector element having detected the optical event comprises setting this optical detector element to the inactive state, and wherein the method comprises, for each detector module of the one or several optical detector modules, determining and outputting a time value, at least for each optical detector element of the optical detector elements of this optical detector module, which is in an inactive state, in dependence on the count value of the counter of this optical detector element and in dependence on the plurality of the time values stored in the memory element, when said computer program is run by a computer.

* * * * *